United States Patent Office 3,277,169
Patented Oct. 4, 1966

3,277,169
FLUOROCARBON-HYDROCARBON POLYETHERS AND METHOD OF PRODUCING SAME
Joseph Leo Warnell, Wilmington, Del., assignor to E. I. du Pont de Nemours and Company, Wilmington, Del., a corporation of Delaware
No Drawing. Filed Apr. 2, 1962, Ser. No. 184,587
3 Claims. (Cl. 260—544)

The present invention relates to novel fluorocarbon-hydrocarbon polyethers, and, more particularly, to polyether copolymers of tetrafluoroethylene epoxide or hexafluoropropylene epoxide with saturated cycloaliphatic ethers.

The novel polyether copolymers of the present invention have the general formula

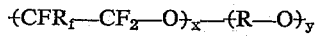

where $R_f$ is a fluorine or a trifluoromethyl radical, $x$ is the number of divalent fluorocarbon epoxide units in the polymer chain and $y$ is the number of divalent ether groups in the polymer chain, $x$ and $y$ each being at least one and the total of $x$ and $y$ being from 2 to 20, and where R is an alkylene radical of 2 to 6 carbon atoms. The foregoing formula illustrates the nature of the chain units of the copolymer which are formed in the copolymerization by ring opening at the oxygen of each of the comonomers. The formula is not to be construed as limiting the copolymers produced by the present invention to block copolymers.

Hexafluoropropylene epoxide is obtained by the oxidation of hexafluoropropylene using aqueous alkaline hydrogen peroxide. Tetrafluoroethylene epoxide is obtained by the oxidation of tetrafluoroethylene with molecular oxygen under the influence of actinic radiation in the presence of traces of a halogen such as bromine.

Ethers which are suitably employed in the present invention are cycloaliphatic, saturated ethers which have from 2 to 6 carbon atoms and include ethylene oxide, tetrahydrofuran, 2,5-dimethyltetrahydrofuran, tetrahydropyran, propylene oxide, oxetane and 1,4-dioxane.

The reaction is carried out by contacting the ether with the fluorocarbon epoxide in the absence of any additional reagents. The reaction temperature will differ depending on the reactivity of the fluorocarbon epoxide. Thus, tetrafluoroethylene epoxide, being more reactive, is polymerized at temperatures of −80° to +50° C. and, preferably, at temperatures of −60° to +20° C., while hexafluoropropylene epoxide is generally copolymerized at higher temperatures, up to 150° C. If desired, inert solvents may be added as diluents. In general, the reaction is carried out by combining the ether and the fluorocarbon epoxide at low enough temperatures to avoid rapid and complete reaction of the reagents, and then gradually warming the mixture to temperatures at which rapid reaction occurs. With highly active cyclic ethers such as ethylene oxide and tetrafluoroethylene epoxide, the copolymerization is carried out by adding the tetrafluoroethylene epoxide slowly to the cyclic hydrocarbon ether maintained at the reaction temperatures. The reaction may be carried out at atmospheric pressure or at higher pressures, pressure not being a critical factor in the reaction. The degree of polymerization is in part controlled by the reaction temperature, higher reaction temperatures leading to lower molecular weight products. The composition of the copolymer can be varied by the quantities of the ether and the epoxide employed.

The formation of the novel copolymers is further illustrated by the following examples.

Example I

Into a dry polymerization flask attached to a manifold system was introduced 4 ml. of tetrahydrofuran and 6 g. of tetrafluoroethylene epoxide at −80° C. The reaction mixture turned cloudy white immediately. After 5.5 hours, excess tetrafluoroethylene epoxide was vented, leaving 5.4 g. of a low melting, waxy copolymer of tetrahydrofuran and tetrafluoroethylene epoxide. The product distilled at 200° to 250° C. (10 mm.) and analyzed for 36.5% carbon and 3.5% hydrogen. This corresponds to a ratio of 3 molecules of tetrahydrofuran to 4 molecules of tetrafluoroethylene epoxide in the polymer. (Calcd.; C., 35.2; H, 3.56.) Infrared analysis indicated one of the end groups to be —COF.

Example II

Into a dry polymerization flask attached to a manifold system was condensed 3 ml. of ethylene oxide at −80° C. The reaction flask was warmed to −25° C. and tetrafluoroethylene epoxide was added cautiously until no further absorption occurred. Approximately 5 g. of tetrafluoroethylene oxide was absorbed. No products boiling below room temperature were present in the reaction mixture. There was isolated 6.6 g. of a clear, viscous liquid copolymer of ethylene oxide and tetrafluoroethylene epoxide. Distillation gave a series of copolymers ranging in boiling point from 73° at 27 mm. to 300° at .1 mm. The average composition of these polymers corresponded to 6 molecules of ethylene oxide to 4.3 molecules of tetrafluoroethylene epoxide. Infrared analysis indicated acid fluoride end groups.

Example III

Using the procedure of Example I, propylene oxide is copolymerized with tetrafluoroethylene epoxide. A copolymer of propylene oxide and tetrafluoroethylene epoxide of similar degree of polymerization as in the product of Example II is obtained.

Example IV

Using the procedure of Example I, oxetane is copolymerized with tetrafluoroethylene epoxide. A copolymer of oxetane and tetrafluoroethylene epoxide of similar degree of polymerization as in Example II is obtained.

Example V

An 80 ml. pressure reactor was charged with 6.2 g. of ethylene oxide, 16.6 g. of hexafluoropropylene epoxide, and 13.2 g. of benzene. The charged reactor was heated to 100° C. and 300 p.s.i. pressure. After two hours, the pressure leveled at 235 p.s.i. The temperature was raised to 150° C. and the pressure was then 310 p.s.i. There was a pressure rise of 335 p.s.i. and then a drop to 315 p.s.i. and it leveled in four hours. From the reaction mixture there was recovered 36 g. of a clear liquid which was distilled through a spinning band column to obtain the following fractions:

| Fraction | Boiling Point | Weight |
| --- | --- | --- |
| 1 | 74–79° C | 15.5 ml. |
| 2 | 39°/180 mm.-dropped | 3.21 g. |
| 2′ | 43°/30 mm.-65°/20 mm | 2.49 g. |
| 3 | 60°/10 mm.-8°/4 mm | 3.61 g. |

Residue—Several grams of higher molecular weight products.

Nuclear magnetic resonance examination of fractions 2′ and 3 and the residue were similar to the extent that there was present acid fluoride, $CF_3$ and $CFCF_2$. Hydrogen resonances in fractions 2′ and 3 and residue appeared to be almost entirely in the same region as $CH_2O$ of $CH_3CH_2OH$. All these resonances were complex. The examination of these fractions indicated that the principal products were products having the structures:

$$CF_3CF_2CF_2O-CH_2CH_2O\overset{CF_3}{\underset{|}{C}F}-COF$$

and $$CF_3CF_2CF_2O(CH_2CH_2O\overset{CF_3}{\underset{|}{C}F}CF_2O)_3CH_2CH_2O\overset{CF_3}{\underset{|}{C}F}COF$$

$$CF_3CF_2CF_2O-CH_2CH_2O\overset{CF_3}{\underset{|}{C}F}-COF \text{ and } CF_3CF_2CF_2O(CH_2CH_2O\overset{CF_3}{\underset{|}{C}F}CF_2O)_nCH_2CH_2O\overset{CF_3}{\underset{|}{C}F}COF$$

The products of the present invention are liquid polyether copolymers having degrees of polymerization varying from 2 to 20 and in their physical state from light solvents and heavy oils to waxy solids. The polyethers of the present invention are a unique combination of hydrocarbon and fluorocarbon ethers. The products are, therefore, extremely useful solvents and lubricants, combining the solvent power and lubricating properties of hydrocarbon ethers with those of fluorocarbon ethers. The products, furthermore, are chemically inert, thermally stable, and non-flammable.

In view of the high reactivity of tetrafluoroethylene epoxide, extreme caution should be used in the handling of this compound.

I claim:
1. A polyether copolymer prepared by mixing together tetrafluoroethylene epoxide and a saturated cycloaliphatic hydrocarbon monoether, containing the ether oxygen and from 3 to 5 carbon atoms in the cycloaliphatic ring at a temperature in the range between —80 to +50° C., said copolymer having $x$ repeating units of the formula

$$-(CF_2-CF_2-O)-$$

and $y$ repeating units of the formula $-(R-O)-$, wherein R is an alkylene radical having from 3 to 5 carbon atoms, $x$ and $y$ at least one and the total of $x$ and $y$ is from 2 to 20.

2. The polyether copolymer of claim 1 wherein R is tetramethylene.

3. A process comprising copolymerizing by mixing together tetrafluoroethylene epoxide and a cycloaliphatic saturated hydrocarbon monoether containing the ether oxygen and from 3 to 5 carbon atoms in the cycloaliphatic ring absent of any catalytic reagent at a temperature in the range between —80 to +50° C., and obtaining as a result thereof a copolymer of said epoxide and said monoether.

References Cited by the Examiner

UNITED STATES PATENTS

| | | | |
|---|---|---|---|
| 2,594,560 | 4/1952 | Howard | 260—653.1 |
| 2,975,161 | 3/1961 | Abramo et al. | 260—92.1 |
| 3,004,961 | 10/1961 | Hauptschein | 260—2 |
| 3,062,794 | 11/1962 | Iserson et al. | 260—92.1 |
| 3,076,784 | 2/1963 | Schulte-Huermann et al. | 260—61 |
| 3,125,599 | 3/1964 | Warnell | 260—2 |
| 3,135,705 | 6/1964 | Vandenberg | 260—2 |

OTHER REFERENCES

Smith et al.: Ind. Eng. Chem. 49, 1241–6 (1957).

WILLIAM H. SHORT, *Primary Examiner.*

JOSEPH R. LIBERMAN, *Examiner.*

S. P. SULLIVAN, S. N. RICE, *Assistant Examiners.*